J. M. HENDRICKS.
Disintegrating-Mill.

No. 160,771

Patented March 16, 1875.

Witnesses:
W. C. Roberts
Thos. H. Burtt

Inventor:
J. Moore Hendricks

THE GRAPHIC CO. PHOTO-LITH. 39 & 41 PARK PLACE, N.Y.

UNITED STATES PATENT OFFICE.

J. MOORE HENDRICKS, OF PHILADELPHIA, PA., ASSIGNOR TO THE PHILADELPHIA DISINTEGRATING-MILL AND MANUFACTURING COMPANY.

IMPROVEMENT IN DISINTEGRATING-MILLS.

Specification forming part of Letters Patent No. 160,771, dated March 16, 1875; application filed February 20, 1875.

*To all whom it may concern:*

Be it known that I, J. MOORE HENDRICKS, of Philadelphia, Pennsylvania, have invented an Improvement in Disintegrating-Mills, of which the following is a specification:

This invention relates to the class of mills embracing the mill for which Letters Patent No. 150,689 were granted to me May 12, 1874.

The principal objects of my invention are, first, to avoid the necessity of arranging the separate sets of "cages" employed in such mills on the ends of opposing shafts, as in the case of Thomas Carr's mill, patented August 10, 1869, and also to obviate the employment of the sleeves described in my said patent, wherein the cages composing one set are shown to be arranged on a through-shaft, and those of the other set on a sleeve working on said through-shaft; second, to construct and arrange the cages and their shafts so that the opposing respective sets of cages shall have the advantages due to the employment of through-shafts—viz., increased steadiness of motion and less friction, as well as freedom from the tendency to undue wear on the shaft-bearings, and from the consequent sagging of the cages, and their tendency to collide and break.

Figure 1:
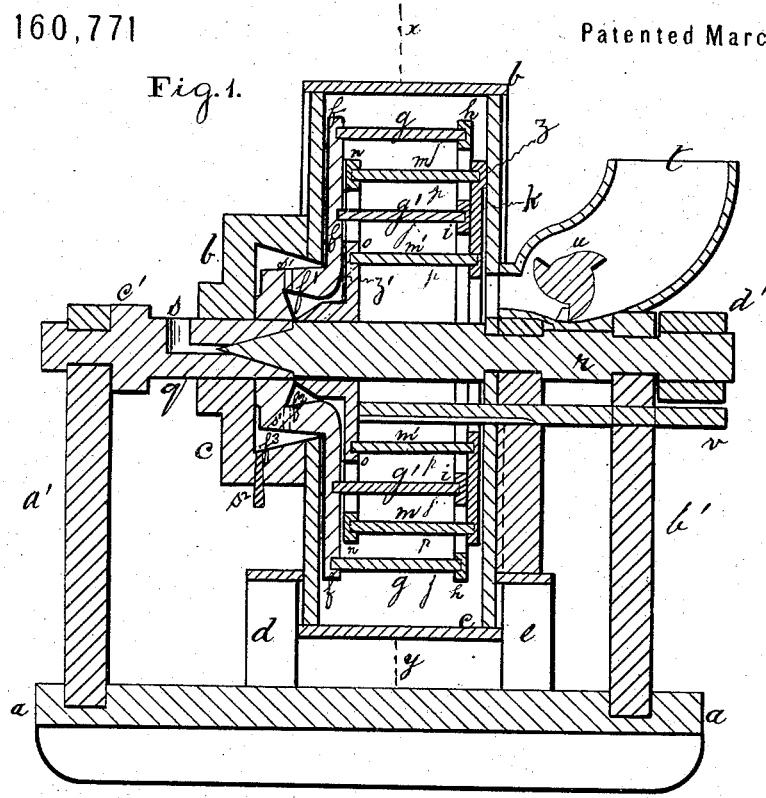
Figure 2:
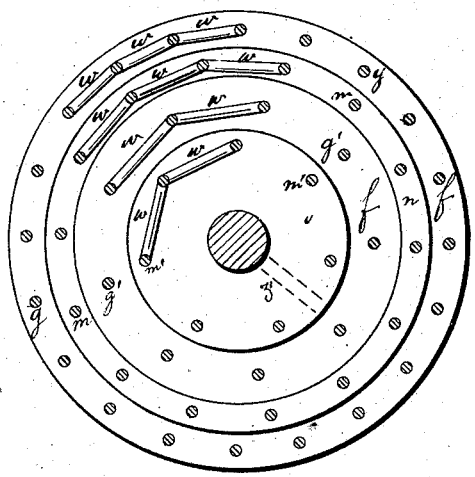
Figure 4:
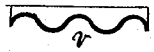
Figure 5:
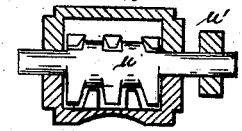
Figure 3:
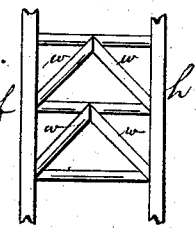

In the drawings, Figure 1 is a vertical cross-section through the middle of the mill, the other figures being detail views, of which Fig. 2 is a cross-section of the cages on the line $xy$ of Fig. 1, omitting the casing. Fig. 3 represents an elevation of a portion of the cage-frames and cross-bars and certain strengthening-bars $w$, (not shown in Fig. 1;) Fig. 4, a vertical cross-section of the bridge $v$; Fig. 5, a vertical cross-section of the hopper $t$, drawn through its toothed shaft.

$a$ represents the floor. $b$ and $c$ form the casing. The lower section $c$ is fixed to upright supports, two of which, $d$ and $e$, are shown. The upper section $b$ is made to be lifted off when necessary. $f$ is a disk, to which one end of each of the cross-bars $g$ and $g'$ is attached, the other ends of said bars, respectively, being attached to rings $h$ and $i$. The face of disk $f$ and the faces of rings $h$ and $i$ are made plain—that is, without recess. Said disk, rings, and cross-bars form one of the two sets of cages employed, and may be referred to unitedly as cage $j$. $k$ is a ring, to which one end of each of the cross-bars $m$ and $m'$ is attached, the other ends of these bars being attached to rings marked $n$ and $o$, respectively. The faces of said last-named rings are also made without recess. The said rings $k$, $n$, and $o$, and the cross-bars $m$ and $m'$, together, form the other of the two sets of cages, and may be referred to unitedly as cage $p$. The cage $j$ is attached to one section, $q$, of the shaft, and the cage $p$ is attached to the other section, $r$, of the shaft, as shown in Fig. 1. The section $q$ is concaved or hollowed out, and the section $r$ is convexed or pointed correspondingly, the concavity of section $q$ forming the bearing of the point or end of section $r$, a solid bearing being obtained by causing the end of section $r$ to project over the side of the lower or fixed section $c$ of the casing, as shown in Fig. 1. The two sections thus united together constitute a through-shaft, which forms a bearing on both sides of the mill for the cages. The hub $f^1$ of disk $f$ is cut out, as shown in Fig. 1, to form a receptacle, $f^2$, for oil, which is introduced through an aperture, $s$, in the section $q$ of the shaft, any surplus oil being allowed to run down and escape through apertures $s^1$, only two of which are shown, into a similarly-formed receptacle, $f^3$, in the casing, and thence through the aperture $s^2$ into any receptacle provided to receive it, the form of the receptacles $f^2$ and $f^3$ being such that the waste oil is kept from getting into the cages among the ground materials, and is discharged outside and saved. $t$ is a hopper, in which I place a toothed shaft, $u$, the teeth of which mesh with other teeth proceeding from the shell of the hopper. $u'$ is a pulley, through which power is applied to the shaft $u$. In said hopper the materials intended to be ground in the mill receive a preliminary grinding, and afterward pass into the cages. $v$, Figs. 1 and 4, is the removable bridge, which is employed for the usual purpose of detaining the materials to be ground, the peculiarity of bridge $v$ being that its lower face is corrugated, or that it is formed of bars like a gridiron. To strengthen the several cross-bars of the cages, and to facilitate the grinding operation, when the mill is intended for crushing quartz or any other bulky hard substance, I employ diagonal bars $w$, which are omitted in the principal figure to avoid obscuring the view, but which, as to a portion of the cross-bars, are shown in Figs. 2 and 3. $z$ and $z'$, Figs. 1 and 2, represent scrapers, to keep the spaces between the opposing rings or disks of the two cages free from ground materials. These scrapers consist of short knives or strips, which project a little beyond the respective opposing faces of said rings or disks, as shown. The outer ends of sections $q$ and $r$ of the shaft bear in upright pedestals $a'$ and $b'$. $c'$ and $d'$ are pulleys for belts, (not shown,) by which motion is imparted to the mill.

I claim—

1. The combination of the fixed portion $c$ of the mill-casing with cages $j$ and $p$, when attached, respectively, to the opposite parts of a shaft formed in two portions or sections, $q$ and $r$, of which one section is concaved or hollowed out at its inner end, to form a socket for the inner or contiguous end of the other section, in the manner and for the purpose substantially as set forth.

2. The bridge $v$, in combination with the cages, when said bridge is constructed in the corrugated or gridiron form, substantially as set forth.

3. The combination of the two sections $q$ and $r$ of the shaft, the oil-induction aperture $s$, the oil-receptacles $f^2$ and $f^3$ in the hub of the cage $j$, and in the casing, respectively, and the oil-eduction apertures $s^1$ and $s^2$, in the manner and for the purpose substantially as set forth.

4. The diagonal strengthening and grinding bars $w$, in combination with the other parts of the cages, respectively, in the manner and for the purpose substantially as set forth.

J. MOORE HENDRICKS.

Witnesses:
W. C. ROBERTS,
THOS. A. BURTT.